Oct. 19, 1965     G. A. GRUSS ETAL     3,212,779
SELECTIVELY ACTUATED BALL PATH INDICATING SYSTEM
Filed Jan. 16, 1962                    7 Sheets-Sheet 1

INVENTORS
GEORGE A. GRUSS
ARTHUR B. VIESCAS
BY
ATTORNEY

Oct. 19, 1965   G. A. GRUSS ETAL   3,212,779
SELECTIVELY ACTUATED BALL PATH INDICATING SYSTEM
Filed Jan. 16, 1962   7 Sheets-Sheet 6

INVENTORS
GEORGE A. GRUSS
ARTHUR B. VIESCAS
BY
ATTORNEY

United States Patent Office 3,212,779
Patented Oct. 19, 1965

3,212,779
SELECTIVELY ACTUATED BALL PATH
INDICATING SYSTEM
George A. Gruss and Arthur B. Viescas, Shelby, Ohio, assignors to American Machine & Foundry Company, a corporation of New Jersey
Filed Jan. 16, 1962, Ser. No. 166,616
34 Claims. (Cl. 273—54)

This invention relates to apparatus for automatic bowling pin spotting machines and more particularly to apparatus for selecting and indicating to a player the proper path along which a ball should be rolled in order to knock down the maximum number of pins.

During the playing of a game of bowling, it is often difficult for the player, particularly if he is a novice, to determine with respect to the standing pins at the end of a bowling alley, exactly where the ball should be aimed in order that the maximum number of pins will be knocked down. Heretofore, a bowler has had to resort either to his own experience gained from playing many games of bowling, or to printed charts showing combinations of pins remaining standing and the optimum ball path associated therewith, in order to determine where the ball should be aimed to knock down the maximum number of pins. Such expedients are obviously unsatisfactory and time consuming, both in attempting to gain the experience or manipulating the charts.

It is therefore an object of the present invention to provide means associated with an automatic pin spotter for automatically calculating and indicating with respect to the pins remaining standing on a bowling alley pin deck, the point at which a ball should be aimed in order to knock down the maximum number of such standing pins.

It is yet another object of the invention to provide a visual indication to a bowler of a position towards which a ball should be rolled, in order to knock down the maximum number of pins regardless of whether a strike or spare is to be made.

It is still another object of the invention to provide a facsimile of the standing pin condition of the pins on the pin deck of the bowling alley prior to the rolling of a ball, said facsimile having indicia selectively displayed thereon which indicate where a ball should contact the standing pins in order to knock down the maximum number thereof.

It is still another object of the invention to provide means for resetting the indicator after a ball has been rolled, in order to provide a fresh ball path indication for the next ball of a frame.

In accordance with the invention, means are provided prior to the rolling of a ball of a frame, for determining the number and arrangement of standing pins. Computing means are further provided for selecting the optimum ball path in accordance with the pin number and arrangement information, and an indicator coupled with the computer is actuated which indicates to the bowler the optimum path so selected. The bowler, by following the visual directions provided by the invention, and rolling his ball accordingly, will thus knock down the maximum number of standing pins each time.

For a better understanding of the invention, together with other and further objects thereof, reference is made to the following detailed description taken in connection with the accompanying drawings, in which.

While the embodiment of the invention illustrated herein is described as being operatively associated with a particular type of pin spotting machine, yet it is adaptable for use with any known automatic pin spotting machine of the general type which spots and respots pins, removes fallen pins from the bowling alley deck, and which operates in accordance with the various ball cycles required by the rules of the game of bowling, viz. first and second ball, strike and foul cycles.

Figure 1:
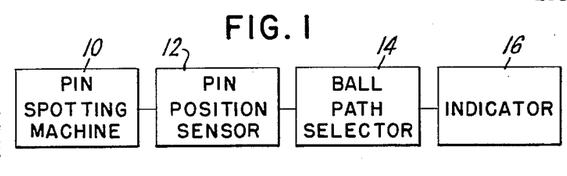
FIGURE 1 is a block schematic diagram of the ball path indicating system of the present invention.

Referring now to the drawings and particularly FIG. 1, the main units forming the system are shown therein in block diagram form. In general, a pinspotting machine 10 has associated therewith a pin position sensor 12 which is capable of sensing at a selected point during a ball cycle, the number and position of standing pins arranged on the pin deck. For proper operation of the invention, the pin position sensor 12 should be capable of sensing and delivering standing pin position information to a ball path selector 14 prior to the start of the second ball cycle of each playing frame.

With respect to the commencement of a first ball cycle, all ten pins are always in a standing position so that sensing this condition by sensor 12 is unnecessary. As it is the principal object of the game of bowling to attempt to achieve a strike with each first ball rolled, then, in this instance, only the optimum path for rolling a strike is shown when pinspotting machine 10 is in a "ready for first ball" condition. The arrangement of the system to always indicate the optimum path for a strike during first ball conditions will be described hereinafter.

Ball path selector 14 comprises a computing unit which, upon receipt of information from pin position sensor 12 as to the number and arrangement of standing pins, is operative to actuate indicia forming a portion of indicator unit 16 which has been arranged to indicate the ball path, which, if a ball were rolled along the path so indicated, would cause the maximum number of pins of those remaining standing to fall. It will be appreciated that the indicia of indicator 16 may take any of a number of forms as may be desired, such as illuminated arrows, bars, movable balls, or other suitable indicia. It is preferable that such indicia be associated with a facsimile of the arrangement of the pins upon the pin deck. The facsimile is preferably in the form of the conventional triangular pin arrangement. It may be mounted in any location where it may be viewed conveniently by a bowler, such as immediately above the pin deck and in front of the pin spotting machine, or placed on a suitable stand adjacent the bowler. Thus, when a bowler is ready to roll a ball, by glancing at the pin deck facsimile and noting the indicia actuated thereon by ball path selector 14, he will thus realize that if he rolls his ball to strike the standing pins in accordance with the information so conveyed by indicator 16, the maximum number of pins will fall.

Figures 2, 2A:
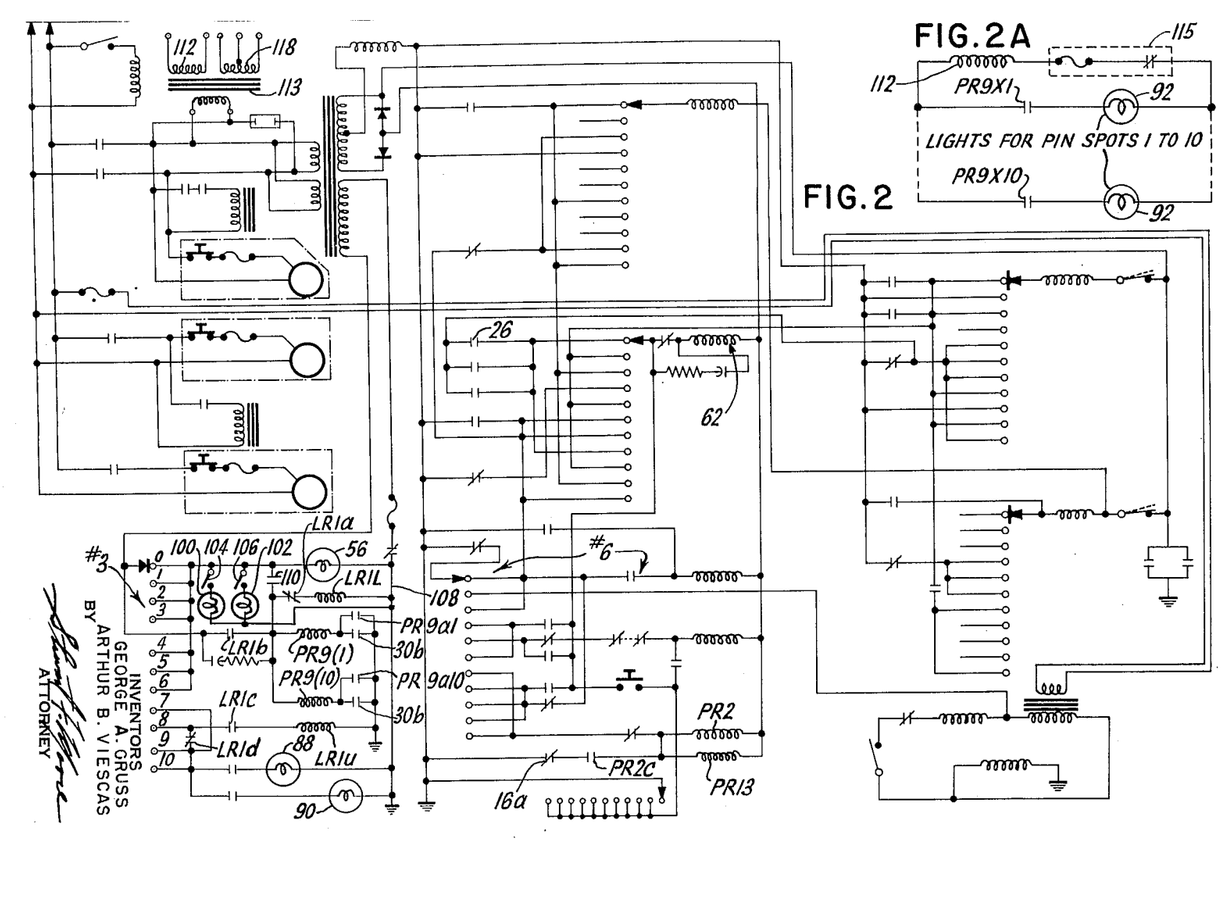
FIGURE 2 is a schematic diagram of a control circuit for the ball path indicating system of the present invention.
FIGURE 2A is a schematic diagram illustrating pin indicating circuit.

In order to fully disclose a preferred form of the invention, it will be described in association with an electrical control system for controlling the operation of a pin spotting machine. One suitable electrical control system is disclosed in R. E. Blewitt, Jr., U.S. Patent 2,983,-510, dated May 9, 1961, which is incorporated by reference as a part of this disclosure. The control circuit illustrated as FIG. 3 in this patent, has been reproduced and is shown in FIG. 2 herein. With the exception of certain circuit modifications for controlling the novel ball path indicating system of the present invention, as will be pointed out in more detail hereinafter, this control circuit is identical in construction and operation to that disclosed in the patent.

Since the cycling operations of any conventional pinspotting machine with which the present invention is associated are unchanged by the novel ball path indicating system, a description of the operation of a machine in general, and in particular an electrical control system therefor, will not be offered herein, but may be found fully described in the above cited Blewitt patent In order to facilitate an understanding of the description of the ball path indicating system, and its relationship to FIG. 3 in Patent 2,983,10, those elements of the control system of FIG. 3 of the patent, herein shown in FIG. 2, which also function in the control of the ball path indicating system, bear the same identifying numerals as those used in the patent.

Referring now to FIG. 2, it will be noted that level 3 of the main control system stepper relay 62 and known as the pin indicator circuit, has been considerably modified from the corresponding FIG. 3 of the Blewitt patent to perform the control functions for the ball path indicating system of the present invention. However, lamps 56, 88, 90 are still connected in the same manner and perform the same functions as heretofore. Lamp 56, when illuminated, indicates that the pinspotting machine is ready for a first ball; lamp 88, when illuminated, indicates that the machine is ready for a second ball; and lamp 90, when illuminated, indicates that a strike has been rolled.

The various circuit elements, mechanical structures, and other details comprising the ball path indicating system and their cooperative relationship to each other, will now be described in connection with a description of the operation of the system.

At the commencement of a first ball cycle, and prior to rolling of the first ball of a frame, the optimum path for rolling a strike is, of course, to roll the ball in such a manner that it enters the pin deck area between the #1 and #3 pins in the case of a right handed bowler, or between the #1 and #2 pins in the case of a left handed bowler. As these are always the optimum strike paths to be displayed, no path computing is needed for the first ball cycle. Thus, lamps 100, 102 selectively actuated by switches 104, 106 respectively, are provided for left and right handed bowlers to be manually activated thereby. The arrangement of lamps 100, 102 for illuminating suitable indicia disposed on a ball path indicator will be described in detail hereinafter.

The lamp circuits are connected between contact #0 of level #3 of master control stepping switch #62 and ground line 108. Thus, before commencing a game the bowler, depending on whether he is left or right handed, actuates one or the other of switches 104, 106. Thereafter, during the sequential engagement of the 7 contact positions of wiper #3 which are the first ball positions, the selectively actuated lamp 100 or 102 will remain illuminated to indicate the desired ball path.

To initiate the operation of the path computing system, the bowler rolls the first ball of a frame which, upon arriving in the pit, strikes the usual cushioning device and causes it to actuate the starting or "pit" switch 26. The master control stepping switch 62 is then actuated in the usual manner, causing the wiping arms of the several levels of this switch to move from contact #1 to contact #2.

Conventional stepping relays usually have a cam associated with the movement of the various contact level arms which closes or opens one or more switches whenever the actuating arms move away from the zero or normal position. These are commonly known as the "off-normal" contacts, and in the case of level #3 of stepping switch 62, a pair of normally open contacts 110, the "off-normal" contacts, are closed whenever the actuating arm of level #3 is away from its zero or normal position. Thus, after pit switch 26 closes and the arm of level #3 moves to contact 2, contacts 110 connected between contact 0 of level #3 and contacts LR1a are closed, causing latching coil LR1L of a 2 coil, conventional latching relay LR1 to be energized through normally closed contacts LR1a. The several contacts of latching relay LR1 are all shown in FIG. 2 with the latch coil LR1L and unlatch coil LR1U deenergized but with the relay armature in the "unlatched" position.

When latch coil LR1L is energized, contacts LR1a are opened, causing power to be removed from latch coil LR1L. However, this transistory energization of latch coil LR1L causes normally open contacts LR1b, connected to the wiping arm of level #3 to close and place the coils of the 10 relays designated as PR9 to one terminal of which contacts LR1b are connected, in a condition for energization. Latch relay LR1 remains in a latched condition even though coil LR1L is deenergized.

The ball path indicating system derives its intelligence primarily from the condition of the PR9 relays after they have been actuated by a suitable pin sensing device. There are 10 PR9 relays, each of which represents and is associated with a bowling pin. In the operation of all known pin spotting machines, somewhere during a first ball cycle it is possible to sense the number and arrangement of pins left standing after the first ball has been rolled and passed across the pin deck. In machines of the type described in Blewitt Patent 2,983,510, a switch associated with each pin respotting unit is actuated at the moment when, during a first ball cycle, the conventional machine table carrying such respotting units descends towards the alley floor and picks up the standing pins.

By arranging each of the PR9 relays to be energized by one of the switches associated with a respotter unit, then from the relay so selectively actuated, the orientation and number of standing pins can be readily determined. For purposes of illustrating the present invention, the pin sensing switches 30b of the Blewitt patent are shown connected in series with the actuating coils of relays PR9 (1–10) in FIG. 2. However, the present invention is not limited to receiving pin position information from sensing devices carried by the machine, but any suitable sensing device associated with a pinspotting machine may be used. For example, it would be obvious to one skilled in the art that the pin sensing system disclosed in Saunders et al. Patent 2,980,424 may be used with the present invention by merely connecting a pair of normally open contacts actuated by each of the "presence" relays 35 shown in the Saunders et al. patent, in place of contacts 30b.

Thus, during the first ball cycle, in accordance with the conventional sequence of operations for a pinspotting machine, when the table descends and picks up all standing pins, the pins picked up thereby will cause associated switches 30b to close and complete the circuit for energization of corresponding PR9 relays. A normally open contact PR9a (1–10), connected in parallel with contacts 30b, is closed upon energization of associated PR9 coils and acts as holding contacts for these relays so that they remain energized until a second ball cycle has commenced. Energization of the PR9 relays also closes contacts PR9x (1–10) each connected in series with a respective pin indicating lamp 92 and a secondary winding 112 of transformer 113 (FIG. 2A). When contacts PR9x (1–10) close, transformer winding 112 provides a current through circuit breaker 115 for illuminating an associated lamp 92. In this manner the normal indicator for identifying the pins remaining standing is actuated and remains in this condition all during the first ball cycle.

Figure 3:
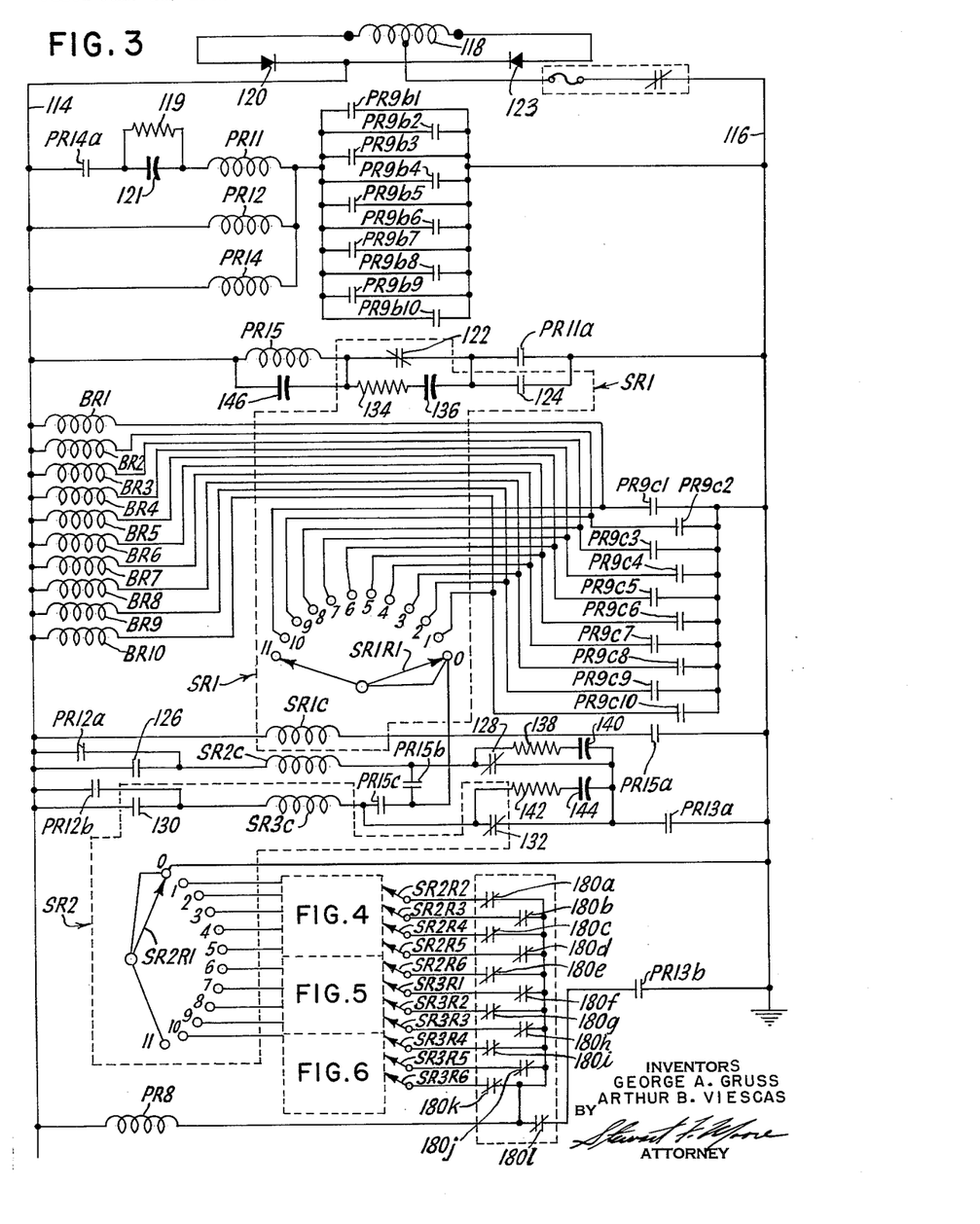
FIGURE 3 is a schematic diagram of a portion of the ball path selector circuit.

Upon energization of the PR9 relays during the first ball cycle, corresponding contacts PR9b are closed (FIG. 3). These contacts are connected in parallel with each other and in series with relay actuating coils PR12 and PR14 across the power output lines 114, 116 of a suitable source of low level D.C. supply such as 12 volts, provided by secondary winding 118 of transformer 113 which in turn is connected to rectifiers 120, 123 in a full wave rectification arrangement. Line 116, connected through a circuit breaker 117 to the center top of output winding 118, and may be grounded if desired.

Simultaneously with the selective energization of certain of the PR9 relays and the closing of associated contacts PR9b, corresponding contacts PR9c are also closed. Closing of these contacts energizes a corresponding multi-contact relay from the group designated as BR(1–10) the coils of which are connected in series with an associated PR9c (1–10) contact and across the power lines 114, 116. Multicontact relays BR(1–10) each have a large number of normally open contacts which are closed simultaneously upon energization thereof and may be of the type known as bar relays. These relays may have as high as 50 sets of contacts. Thus for each discrete pin remaining standing a corresponding bar relay is actuated and all of its contacts are closed. The sets of contacts associated with each of bar relays BR(1–10) are arranged in vertical columns as indicated by the dashed vertical lines on FIGS. 4, 5 and 6.

The closing of at least one of the PR9b contacts energizes the coil PR14, a time delay relay, which upon conclusion of its timing period, which may be approximately one second, closes contacts PR14a connected in series with parallel connected time constant elements, resistor 119, capacitor 121, and the coil of relay PR11. Relay PR11 is energized during a portion of the time that it takes capacitor 121 to charge, which is sufficient to close contacts PR11a, connected in series with the interruptor contacts 122 of a stepper relay SR1. Upon closing of contacts PR11a, the coil of relay PR15, connected in series therewith and interruptor contacts 122 across power lines 114, 116 is energized thereby closing contacts PR15a, PR15b, PR15c. As the contacts PR15a are connected in series with the coil SR1c of stepping switch SR1 and across power lines 114, 116, the closure thereof will cause the stepping switch SR1 to be energized and step off of 0 and being to sweep through contacts 0–11.

As soon as stepper switch SR1 indexes from contacts 0 to contact set 1, its off-normal contacts 124, connected in parallel with contacts PR11a, close thereby providing a holding path for stepper switch SR1 until it has swept through all 11 contacts and returned to 0 where off-normal contacts 124 are again opened. During the sweeping period, capacitor 121 is slowly discharged through resistor 119 so that by the time SR1 has returned to 0 position contacts PR11a are opened.

Connected between power lines 114, 116 is an actuating circuit for a second multi-level stepper relay SR2, which circuit comprises off-normal contacts 126, the operating coil SR2c for the stepping relay SR2, interruptor contacts 128, and contacts PR13a, all connected in series with each other. Another circuit for operating a third stepping relay SR3 (FIGS. 5, 6) is also connected between power lines 114, 116, which circuit comprises off-normal contacts 130 for the stepper relay SR3, coil SR3c, interruptor contacts 132, and relay contacts PR13a, all connected in series. Connected in parallel with off-normal contacts 126, 130 are contacts PR12a and PR12b. Connected in parallel with interruptor contacts 122, 128, 132 of stepper relays SR1, SR2, SR3 are contact arc suppressor circuits comprising respectively, resistor 134 and capacitor 136, resistor 138 and capacitor 140, and resistor 142 and capacitor 144.

The rotor SR1R1 of stepping relay SR1 is connected through normally open contacts PR15b, PR15c to one terminal of operating coils SR2c, SR3c. As the rotor arm SR1R1 of stepping relay SR1 sweeps through its ten sets of active contacts, each time it engages a contact connected to a closed PR9c contact, a circuit will be formed between the closed PR9c contact, the corresponding contact of stepping relay SR1, closed contacts PR15b, PR15c, the operating coils SR2c, SR3c, and closed contacts PR12a, PR12b to line 114. In operation then, each time the circuits just described are closed, stepper relays SR2, SR3 are advanced one position. Accordingly, after stepper relay SR1 has swept through its ten active contacts and returned to 0, stepper relays SR2, SR3 will each have been advanced to a contact which reflects the number of standing pins. Accordingly, information as to the number of standing pins has now been extracted from the sensing device 12, and stored in relays SR2 and SR3.

Time delay relay PR14 is provided in order to permit all energized PR9 relays to close before the start of the standing pin search and count operation. The contacts PR12a and PR12b of relay PR12 act as off-normal by-passes to permit both counting steppers SR2 and SR3 to start together. To further synchronize the action between these two counting stepper relays, relay PR15 has its actuating coil connected in series with the interruptor circuit of stepper relay SR1. Stepper relays SR2 and SR3 must therefore count together as they cannot operate until contacts PR15b and PR15c are closed, which in turn depends upon the energization of coil PR15 by the closure of interruptor contact 122. A capacitor 146 is connected across the actuating coil of relay PR15 in order to adjust the timing action of this relay.

The path selection circuitry of ball path selector 14 will now be described. The total number of theoretical spare pin combinations that may exist in a game of bowling after a first ball is rolled, is 1023, with the largest number of combinations being combinations occurring when 3, 4 or 5 pins remain standing. However, it is possible to eliminate a large number of the 1023 combinations as it is impossible to roll such combinations as the game is normally played.

For example, in the instance where one pin is knocked down there are 10 theoretical combinations, but since, as the game is normally played, it is practically impossible to knock down any single pin except the 7 or 10 pin, the practical number of combinations where 1 pin is knocked down should be reduced to 2. As a further example it will be seen readily that it is impossible to knock down either the number 8 or 9 or both the 8 and 9 pins together without knocking down any of the pins positioned in the rows in front of these pins. By eliminating all of the "impossible to make" spare combinations, approximately 200 combinations are left that are practically possible to be made. Of these 200 about 125 are likely to occur, with the remaining 75 occurring rarely if ever.

Figure 4:
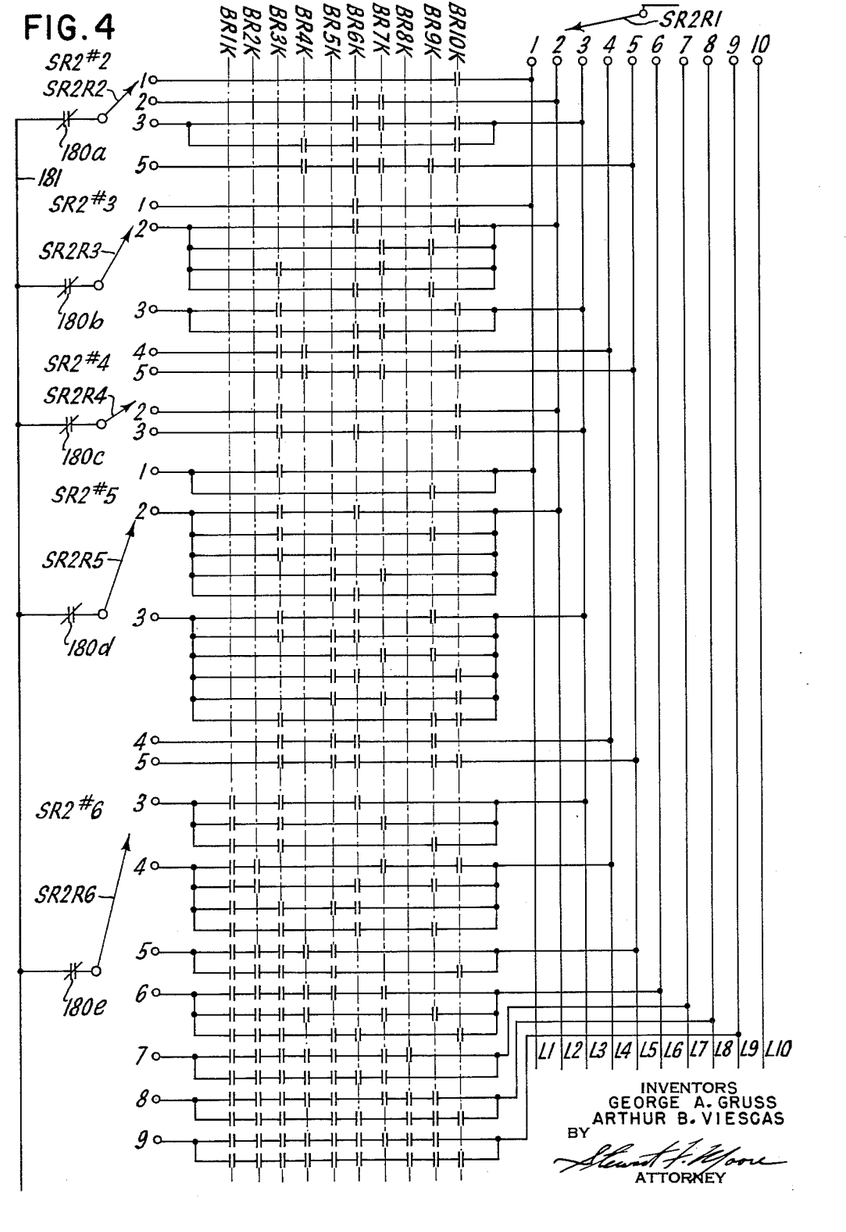
FIGURES 4, 5, 6 are schematic diagrams of circuits representing selected standing pin combinations.
Figure 5:
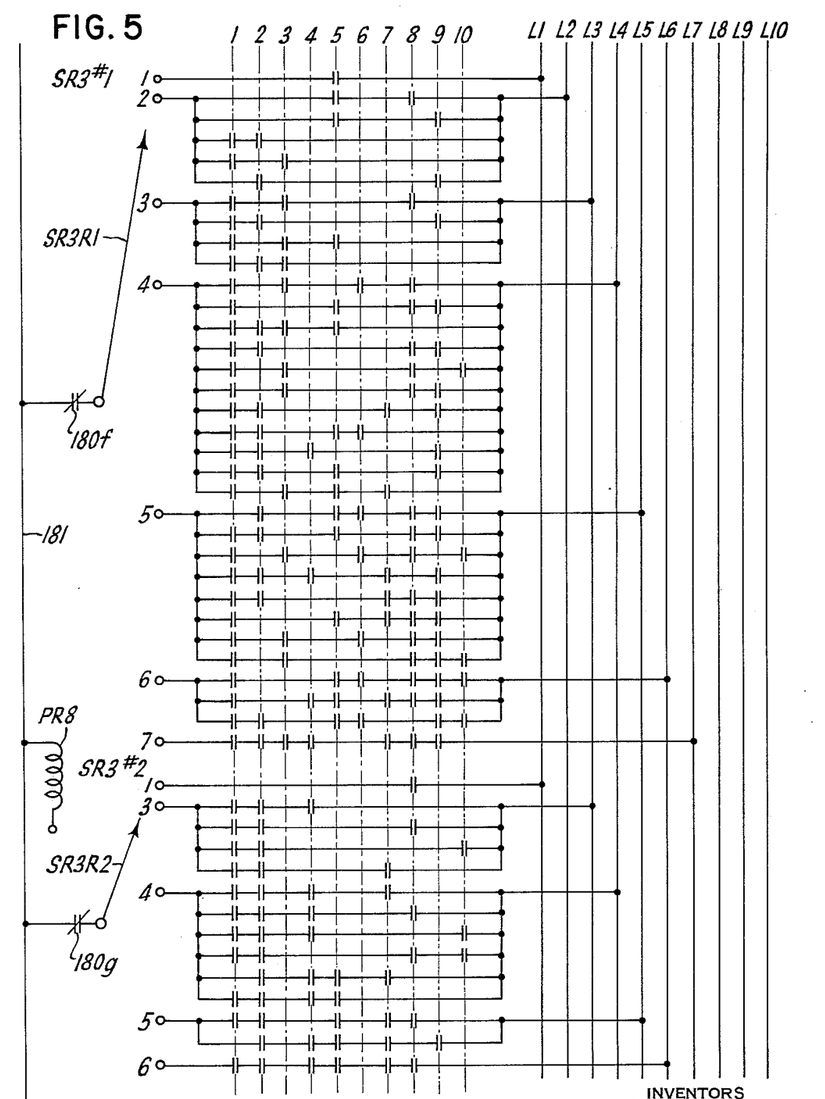
Figure 6:
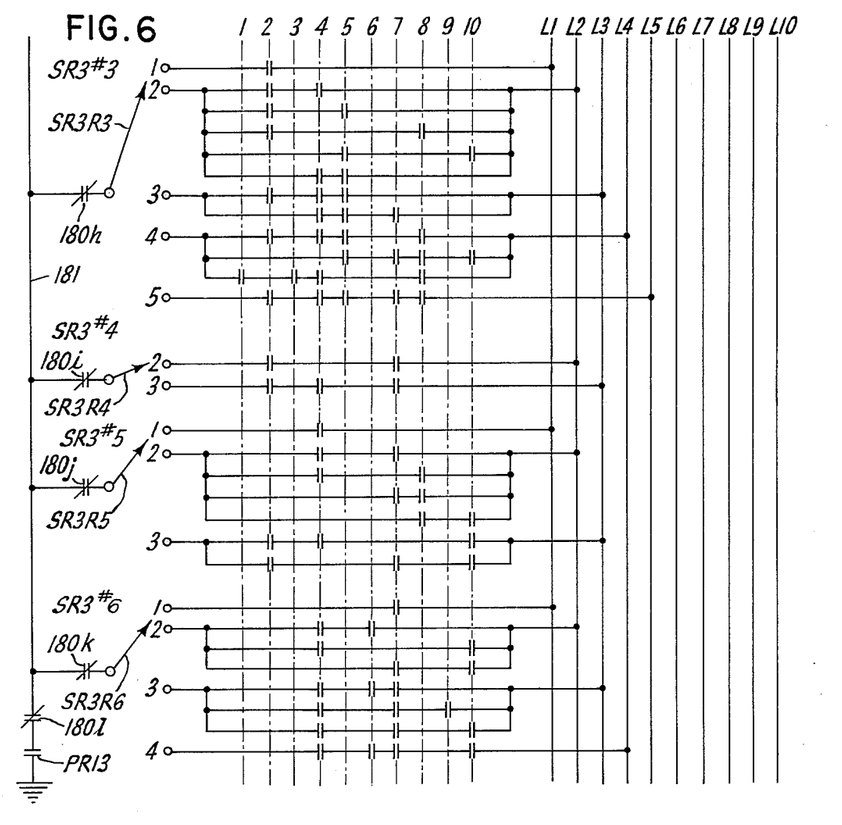
Figure 7:
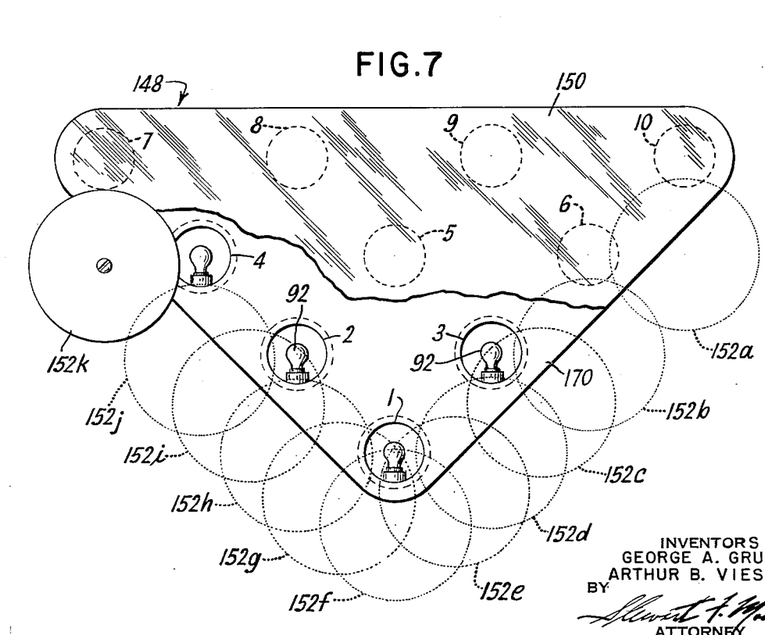
FIGURE 7 is a plan view of one embodiment of a ball path indicator in accordance with the present invention.

Referring now to FIGS. 4, 5 and 6, these 125 combinations are shown therein in electrical analog form. The circuits shown are arranged to select the most optimum ball path whenever any of the 125 spare standing pin combinations occur. It will be understood that by following the teachings of the invention, and particularly the general pattern of circuit arrangements about to be described, the remaining 75 spare combinations could easily be added or for that matter, all 1023 combinations could be provided, although economically impractical.

The individual contacts forming the contact bank of each bar relay BR(1–10) are arranged in vertical columns as indicated by the dashed lines on FIGS. 4, 5 and 6. Each contact column has been designated as BR1K . . . BR10K. Selected ones of these contacts are serially interconnected with each other, with lines designated as L1–10, and also with selected contacts of the several levels of stepper relays SR2 and SR3. Lines L1–L10 are connected to corresponding contacts 1–10 of level 1 of stepping relay SR2. The rotary wiper arm of this relay is designated as SR2R1. Lines L1–L10 are illustrated as running vertically on the right hand portion of FIGS. 4, 5 and 6. FIG. 5 is a continuation of FIG. 4 and FIG. 6 is a continuation of FIG. 5. That is, lines L1–L10 terminating at the lower right hand portion of FIG. 4 begin again at the top right hand portion of FIG. 5 and the same is true of the lines L1–L10 of FIG. 6. These lines are connected in sequence to each other. The horizontal, serial connections between the contacts of bar relays BR1–10 are shown as the horizontal columns of FIGS. 4, 5 and 6 and have one terminal connected to a selected one of lines L1–10 and another terminal connected to one of the contacts of a selected level of either relay SR2 or SR3. The contact of these levels are indicated as 1–9, the several levels associated with the contacts are designated by the symbol (#). Associated with each level of stepper switches SR2 and SR3 are corresponding wiper arms designated as SR2R1–R6 and SR3R1–R6.

In general, the path selector 14 operates as follows: After a first ball is rolled, the standing pins are sensed, the sensed information conveyed to the PR9 relays, and each bar relay BR(1–10) associated with a standing pin, is energized. All of the contacts BR(1K–10K) associated with an energized bar relay are closed, and stepper relays SR2 and SR3 have advanced as the count of standing pins is transferred thereto from operation relay SR1. As each BR(1K–10K) contact represents a standing pin in one of the selected spare combinations, it will be seen that for every spare combination a circuit path will be closed between the wiping arm SR2R1, one of the lines L1–L10 and a selected contact of one of the rotor arms associated with a selected level of relay SR2 or SR3.

For example, with reference to FIG. 4, if the 6, 7 and 10 pins remain standing after the first ball has been rolled, then after the events just described have occurred, rotor arm SR2R1 will have advanced to contact #3 and will make a connection with line L3. Furthermore, bar relay contacts BR6K, BR7K, BR10K in columns 6, 7 and 10 will have closed, and rotor arm SR2R2 will have advanced to contact #3 of level 2 so that a circuit is completed between this rotor arm through the bar contacts to line L3. An inspection of FIGS. 4, 5 and 6 will show that this is the only closed circuit for this spare arrangement.

As an additional example and with reference to FIG. 5, suppose that after the first ball is rolled, pins 1, 2, 3, 4 and 7, 8 and 9 remain standing. Stepper relays SR2 and SR3 will advance 7 steps but the only circuit path completed will be between line L7, contact 7 of SR3 level 1 to SR3R1. In a like manner any of the 125 illustrated spare circuit combinations may be traced.

As there is now available a circuit which has been completed in response to the occurrence of a spare combination of standing pins, this closed circuit condition may be used to actuate an indicator which has indicia arranged to indicate a pre-selected optimum ball path along which to aim and roll a ball against the indicated standing pins. A suitable indicator may take any one of a number of different forms and the present invention is not limited by the indicator described herein. For purposes of illustration, one embodiment of such an indicator is shown in FIGS. 7–10.

Preferably, a facsimile of the triangular arrangement of the pins upon the pin deck is displayed in a facsimile device 148 which has a translucent face mask 150 covering a plurality of lamps 92 suitably mounted in apertures 1–10 (FIG. 7) and arranged in the desired triangular configuration. Lamps 92 serve to indicate to a bowler the pins which remain standing after a first ball has been rolled, and are shown in FIG. 2A as being actuated by the closing of switches PR9x1–10. The facsimile device 148 may be mounted in any desired location in the vicinity of the bowler and within range of his vision.

Figure 8:
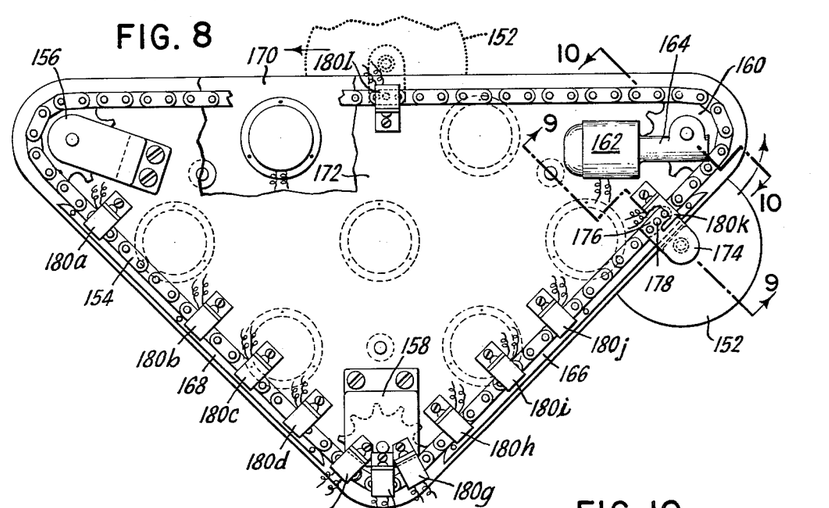
FIGURE 8 is a rear view of the ball path indicator of FIG. 7.

Disposed adjacent the outer perimeter of facsimile device 148 is a bowling ball facsimile 152 which is attached to a chain 154 mounted adjacent the rear surface of facsimile device 148 (FIG. 8). Chain 154 is movably supported by sprockets 156, 158, 160. A motor 162 drives sprocket 160 and in turn chain 154 through a suitable gear reduction mechanism (not shown) in housing 164. It will be seen that when motor 162 is energized, chain 154 will cause ball facsimile 152 to travel a path around the outer perimeter of facsimile device 148. A pair of rails 166, 168 are mounted adjacent chain 154 to provide a guide therefor and to prevent chain 154 from sagging as it describes its path of travel along the shorter sides of triangular facsimile 148.

Figure 9:
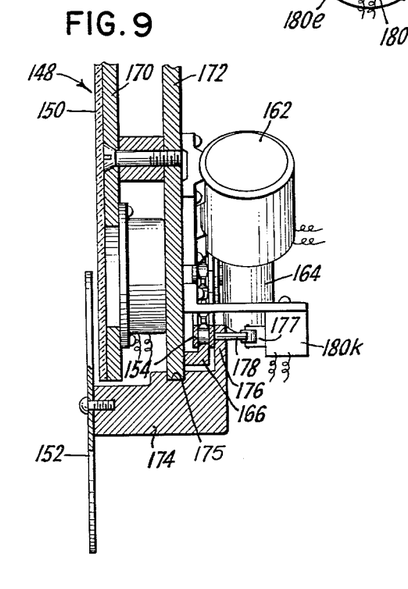
FIGURE 9 is a section taken along the lines 9—9 of FIG. 8.
Figure 10:
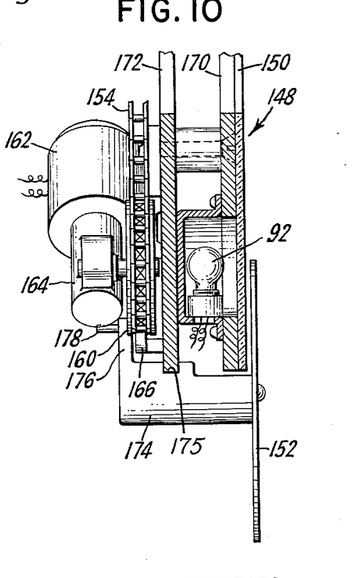
FIGURE 10 is a section taken along the lines 10—10 of FIG. 8.

The driving arrangement for ball facsimile 152 is shown in more detail in FIGS. 9 and 10. Facsimile device 148 has a backing plate 170 for translucent face mask 150, which is secured in spaced relation to a tracking plate 172 which has a triangular configuration corresponding to the general outline of facsimile device 148. A bracket 174 secured to ball facsimile 152 has a channel 175 which is adapted to slidably engage track 172 and be guided thereby during its course of travel about the outer perimeter of plate 172, as it is driven by chain 154. Thus, it will be seen that ball facsimile 152 will progress around the perimeter of facsimile device 148 whenever chain 154 is set into motion. Bracket 174 is secured to chain 154 by means of an outwardly extending arm 176 which also has a projecting pin 178 affixed thereto.

Figure 12:
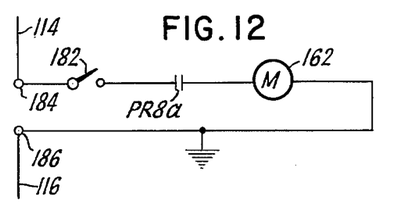
FIGURE 12 is another embodiment of the circuit for operating the drive motor of the ball path indicator of FIG. 7.

Mounted along the marginal edges at discrete positions on tracking plate 172 are a plurality of normally closed switches 180a–k, each of which is respectively connected in series with an associated rotor SR2R2–6, SR3R1–6 of stepping switches SR2 and SR3, and to one terminal of relay coil PR8, the other terminal of which is connected to power line 114 (FIGS. 3, 4, 5, 6). As shown in FIG. 12, relay PR8, when energized, is adapted to actuate motor 162 by the closure of normally open contacts PR8a which are connected in series with one terminal of motor 162, a switch 182 and terminal 184 which is connected to power line 114. The other terminal of motor 162 is connected to ground or to power line 116 by means of terminal 186.

As motor actuating relay PR8 is in turn actuated by only one of the 125 ball path selector circuits having a circuit completed between line 116, rotor SR2R1, and one of the normally closed contacts 180a–k, motor 162 will therefore cause ball facsimile 152 to move about its path of travel until pin 178 on bracket arm 176 engages with the actuating arm 177 of one of switches 180a–k, associated with the activated ball path selector circuit. As these switches are normally closed, the engagement of pin 178 with the switch of the activated circuit causes this switch to open, thereby deactivating the ball path selector circuit, deenergizing motor 162, and causing ball facsimile 152 to stop in a position defined by the location of the associated switches 180a–1.

It will therefore be seen that ball facsimile 152 can be caused to stop at any position about the perimeter of facsimile device 148 according to the selected location of switches 180a–k. These switches are therefore positioned, according to the pin standing combinations which they represent, where it is arbitrarily decided that ball facsimile 152 should indicate to a bowler the optimum path along which the bowling ball should be rolled to knock down the instant standing pins. Eleven such positions found by experience to have provided most satisfactory results are shown in dotted outline of ball facsimile 152 in FIG. 7. These positions so outlined, correspond to the locations of switches 180a–k as shown in FIG. 8.

For example, assume that after a first ball has been rolled, pins 2, 4 and 7 remain standing. Then the rotor of relay SR2R1 will advance to line L3 when relay SR2 receives a count of 3 pins from the scanning operation of relay SR1. Likewise the rotor SR3R4 of relay SR3 will advance to its associated contact #3. Corresponding bar relays BR2, BR4, BR7 will be energized upon closure of contacts PR9c, 2, 4, 7 respectively. A closed circuit will thus exist between ground, line L3, switch 180i, and the coil of relays PR8. Motor 162 will then be energized and will cause ball facsimile 152 to move to position 152i at which point pin 178 on bracket 176 will engage a leaf spring contact actuator 177 on switch 180i, each of switches 180 being of the microswitch type and having an extending leaf spring which closes a pair of contacts upon the application of slight pressure thereto. As the opening of normally closed contact 180i interrupts the selector circuit, relay PR8 is deenergized, thereby causing the ball facsimile 152 to remain at the point where deenergization of motor 162 has taken place. The indication as to where the bowler is to roll the next ball in order to effect a complete spare is thus displayed until the delivery of a second ball.

Referring now to FIG. 2, at the commencement of a second ball cycle, stepper relay 62 has advanced to step 7 where it awaits delivery of the second ball. After a second ball has passed across the pin deck, it actuates pit switch 26 in the usual manner which in turn causes stepper relay 62 to move from step 7 to step 8. On step 8 of level 3 unlatch coil LR1U of latching relay LR1 is momentarily energized through contacts LR1c which were previously closed when latch relay LR1 was placed in a latch condition during the first ball cycle. Energization of unlatch coil LR1U places contacts LR1a, LR1b, LR1c in their normally open or unlatch condition and a contact LR1d connected between stepper relay positions 8 and 9 of level 3 in a normally closed position. Contacts LR1d serve to prevent premature energization of unlatch coil LR1U when stepper relay 62 is on #7 position, but yet allow the normal functions of positions 7–10 to occur. The coil LR1U is of course deenergized when contacts LR1c open on step 8. When contacts LR1b open, the coils of relays PR9 (1–10) are deenergized, thus opening all associated contacts PR9a–c thereby removing power from all units associated with ball path selector 14 and indicator 16 including bar relays BR1–10, the associated contacts of which now resume their normally opened condition. The second ball light 88 and strike light 90 function in the normal manner as described in Blewitt Patent 2,983,510 as the circuit for actuating these indicator units remain unchanged.

The resetting of stepping switches SR2, SR3 and the return of ball facsimile 152 to a "home" position will now be described. When the rotor arm of stepping relay 62 (FIG. 2) reaches position #10 a relay PR13 connected in parallel with spotting control relay PR2 is energized. PR2 functions in its normal manner as described in Blewitt Patent 2,983,510 to control the spotting of the new set of pins upon the pin deck after a second ball has been rolled and the dead wood has been swept away. When PR13 is energized, normally open contacts PR13a (FIG. 3) connected between the interruptor contacts 128 and 132 of stepping relays SR2 and SR3 and lower line 116 are closed, thus causing the rotors of these stepping relays to advance through the remaining contact positions and return to 0 whereupon the respective off-normal contacts 126, 130 of relays SR2 and SR3 open and deenergize actuating coils SR2c and SR3c. Relays SR2 and SR3 are then placed in a "cleared" condition, ready for operation after a first ball of the next frame is rolled.

Normally open contacts PR13b, connected in series with normally closed switch 180l and one terminal of relay PR8 are also closed upon energization of relay PR13. Activation of these contacts causes relay PR8 to again become energized, which in turn causes motor 162 to drive ball facsimile 152 to a selected "home" position at which point further movement of ball facsimile 152 is halted by the opening of a switch 180l positioned at the "home" point and actuated in a manner identical with switches 180a–k. The "home" position may be any selected point about the perimeter of the facsimile device 148 such as at the top thereof as shown in FIG. 8, or it may be located at the appropriate ball path position for rolling a strike on the first ball of the next frame if desired.

Switch 16a (FIG. 2) performs the same function as described in the Blewitt patent. It is so mounted on a pin spotting machine with respect to the distribution of pins to the normal spotting and respotting cells of a table that when the first pin has been fed to the cells, contacts 16a will be opened, thus deenergizing relay PR2, as stepping switch 62 has now returned to 0 position. As the coil of relay PR13 is in parallel with the coil of relay PR2 it likewise is deenergized.

When stepper relay 62 has reached 0 position, off-normal contacts 110 of level #3 reopen and prevent latch coil LR1L from being energized. This eliminates the possibility of false energization of the PR9 coils if switches 30b were to close momentarily as the spotting cups associated therewith are swung back to 0 position after spotting a new set of pins upon the pin deck.

The entire ball path indicator system has now been "cleared" and is in a condition ready to indicate the optimum ball path after the first ball of the next succeeding frame is rolled.

Figure 11:
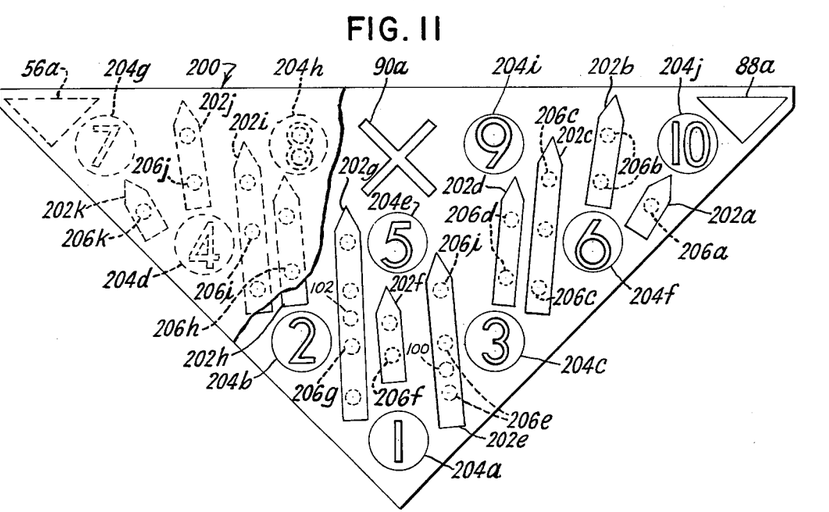
FIGURE 11 is another embodiment of a ball path indicator in accordance with the present invention.
Figure 13:
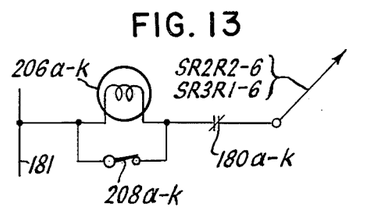
FIGURE 13 is a schematic diagram of the circuit for operating the indicating lamps of the ball path indicator of FIG. 11.

A modification of the ball path display of indicator 16 is shown in FIGS. 11 and 13. If desired, instead of indicating the optimum ball path by means of a movable facsimile disk 152, other display devices such as illuminable indicia disposed about a pin deck facsimile such as shown in FIG. 11 may be used. In FIG. 11 a pin deck facsimile 200 has a plurality of illuminable arrows 202a–k associated with illuminable standing pin indicia 200a–j which are adapted to be illuminated in the normal manner by means of associated lamp 92. Arrows 202a–k correspond generally to the selected positions for ball facsimile 152. By providing each indicia arrow 202a–k with an associated lamp 206a–k, each of which is respectively connected in series with power line 114, and one of switches 180a–k as shown in FIG. 13, then each time a standing pin combination circuit associated with one of the switches 180a–k is actuated, a closed circuit for the lamp 206a–k associated therewith will be established between lines 114, 116 thereby causing the selected ball path indication arrow to be illuminated. A switch 208a–k is connected in shunt across each respective lamp for shorting out the lamp terminals when the use of the lamp is not desired. Likewise, a switch 182 is provided in motor circuit (FIG. 12) for deenergizing motor 162 when it is not desired to have ball facsimile 152 in operation. Of course it is understood that any other type of suitable indicia such as a series of illuminable bars may be used in place of arrows 202a–k.

The facsimile device 200 in FIG. 11 preferably has a translucent face mask 208 covering the indicia devices so that only the outlines of the symbols themselves are displayed to the bowler. Also, if desired, first ball indicator lamp 56, second ball indicator lamp 88, and strike indicator lamp 90 (FIG. 2) may be located so as to illuminate respective indicia 56a, 88a, and 90a. Also, if desired, each of lamps 100, 102 may be substituted for one of lamps 206e, 206g respectively so that indicia 202e and 202g are illuminated to indicate to a bowler where to roll a first ball of a frame.

While the present invention has been disclosed by means of specific illustrative embodiments thereof, it would be obvious to those skilled in the art that numerous other arrangements and modifications in the means of operation described or in the apparatus, may be made without departing from the spirit of the invention as defined in the appended claims.

What is claimed is:

1. In an apparatus for instructing a bowler as to the best path along which to roll a bowling ball at an array of standing bowling pins, an indicator for indicating a selected optimum path of travel, first means for operating said indicator to indicate the selected optimum path of travel along which said ball should be rolled, second means operative in response to selection of a desired pin combination for selectively actuating said first mentioned means, and pin combination selection means coupled to said second means and operative to receive information representative of a selected pin combination and selectively actuate said second means in accordance with said received information.

2. A ball path indicating system for a bowling alley comprising, means for establishing the identity of standing pins on a bowling alley pin deck, an indicating device having indicia for indicating to a bowler the positions corresponding to the standing pin positions on a bowling alley, means coacting with said indicia to indicate to the bowler a selected path along which to roll a ball to knock down the maximum number of pins, and means operative in response to actuation of said identity establishing means for actuating said ball path indicating means to establish said selected path of travel.

3. Apparatus for instructing a bowler as to the best path along which to roll a ball to knock down the maximum number of pins on a bowling alley, comprising, a plurality of means arranged to correspond to an array of pins standing upon an alley and selectively operable to provide a visual representation of a desired combination of pins, second means associated with the first mentioned means and operable selectively to indicate any one of a plurality of paths which a ball might take in approaching said pins, means coacting with said first and second mentioned means to effect a selection of those first mentioned plural means representnig a desired pin combination and to operate the second mentioned means to indicate a corresponding optimum ball path for knocking down said desired combination.

4. An apparatus for instructing a bowler as to the best path along which to roll a bowling ball at an array of standing bowling pins comprising in combination, an indicator for indicating a selected optimum path of travel, means mounting said indicator for movement to a selected position relative to the positions occupied by said standing pins to indicate said optimum path along which a ball should be rolled, and ball actuated means operative in response to the rolling of a ball for operating said indicator to effect its movement to said selected position.

5. An apparatus for instructing a bowler as to the best path along which to roll a bowling ball at an array of standing bowling pins comprising in combination, an indicator for indicating a selected optimum path of travel, means mounting said indicator for movement to a selected position relative to the positions occupied by said standing pins to indicate said optimum path along which a ball should be rolled, means for operating said indicator to effect its movement to said selected position, means for determining the identity of a standing pin combination, and means coupled to said combination determining means and operative in response to the determination of a desired pin combination to selectively actuate said indicator operating means.

6. Apparatus for instructing a bowler as to where his ball should be when it enters an array of standing bowling pins in order to obtain maximum pinfall comprising, an indicator for indicating a predetermined point of entry a ball should have when entering an array of standing pins, computing means coupled to said indicating means for selecting a predetermined optimum point of entry corresponding to a selected standing pin combination, and read-in means coupled to said computing means and operative, when actuated, to read into said computing means information representative of a selected pin combination, said computing means being operative in response to pin combination information received from said read-in means to select the predetermined optimum point of entry corresponding to said received pin information and actuate said indicator accordingly to indicate said selected point of entry.

7. Apparatus for instructing a bowler as to where his ball should be when it enters an array of standing bowling pins in order to obtain maximum pinfall comprising, an indicator for indicating a predetermined point of entry a ball should have when entering an array of standing pins, said indicator comprising a plurality of selectively operable, ball entry position indicating signals, computing means coupled to said indicating means for selecting a predetermined optimum point of entry corresponding to a selected standing pin combination, and read-in means coupled to said computing means and operative, when actuated, to read into said computing means information representative of a selected pin combination, said computing means being operative in response to pin combination information received from said read-in means to select the predetermined optimum point of entry corresponding to said received pin information and actuate one of said indicating signals to indicate said selected point of entry.

8. The invention defined in claim 7 wherein said signals include illuminable means for visually informing the bowler of the optimum point of entry his ball should have when entering the selected array of standing pins.

9. Apparatus for instructing a bowler as to where his ball should be when it enters an array of standing bowling pins in order to obtain maximum pinfall comprising, an indicator for indicating a predetermined point of entry a ball should have when entering an array of standing pins, means mounting said indicator for movement to a selected position relative to the positions occupied by said standing pins to define said point of entry, computing means coupled to said indicating means for selecting a predetermined optimum point of entry corresponding to a selected standing pin combination, and read-in means coupled to said computing means and operative, when actuated, to read into said computing means information representative of a selected pin combination, said computing means being operative in response to pin combination information received from said read-in means to select the predetermined optimum point of entry corresponding to said received pin information and actuate said indicator to effect its movement to said selected point of entry.

10. Apparatus for instructing a bowler as to where his ball should be when it enters an array of standing bowling pins in order to obtain maximum pinfall comprising, an indicator having indicia for indicating to a bowler the positions corresponding to the standing pin positions on a bowling alley, means coacting with said indicia for indicating a predetermined point of entry a ball should have when entering an array of standing pins, computing means coupled to said indicating means for computing and selecting a predetermined optimum point of entry corresponding to a selected standing pin combination, and read-in means coupled to said computing means and operative, when actuated, to read into said computing means information representative of the number and position of standing pins forming a selected pin combination, said computing means being operative in response to pin combination information received from said read-in means to select the predetermined optimum point of entry corresponding to said received pin information and actuate said point of entry indicating means accordingly to indicate said selected point of entry.

11. Apparatus for instructing a bowler as to where his ball should be when it enters an array of standing bowling pins in order to obtain maximum pinfall comprising, an indicator for indicating a predetermined point of entry a ball should have when entering an array of standing pins, computing means coupled to said indicating means for computing and selecting a predetermined optimum point of entry corresponding to a selected standing pin combination, read-in means coupled to said computing means and operative, when actuated, to read into said computing means information representative of a selected pin combination, said computing means being operative in response to pin combination information received from said read-in means to select the predetermined optimum point of entry corresponding to said received pin information and actuate said indicator to indicate said selected point of entry, means for detecting the rolling of a first ball of a frame, and means coupled to said detecting means and said read-in means and operative in response to the rolling of said first ball to actuate said read-in means.

12. Apparatus for instructing a bowler as to where his ball should be when it enters an array of standing bowling pins in order to obtain maximum pinfall comprising, an indicator for indicating a predetermined point of entry a ball should have when entering an array of standing pins, computing means coupled to said indicating means for selecting a predetermined optimum point of entry corresponding to a selected standing pin combination, read-in means coupled to said computing means and operative, when actuated, to read into said computing means information representative of a selected pin combination, said computing means being operative in response to pin combination information received from said read-in means to select the predetermined optimum point of entry corresponding to said received pin information and actuate said indicator accordingly to indicate said selected point of entry, means operative prior to the rolling of a first ball of a playing frame for selectively actuating said indicator to indicate the optimum path for rolling a strike, and other means operative after a first ball has been rolled for actuating said read-in means.

13. Means for indicating the optimum point of entry of a bowling ball into an array of standing pins for knocking down the maximum number of pins on a bowling alley comprising, a plurality of discrete means for sensing the position of each standing pin, means for interrogating each of said sensing means to determine the standing pin combination, storage means for storing the pin combination by said interrogating means, an indicator for indicating a predetermined point of entry a ball should have when entering an array of standing pins, and readout means connected to said storage means and said indicator and operative in response to actuation of said sensing means for reading out of said storage means a selected combination stored therein and actuating said indicator accordingly to indicate an optimum point of entry corresponding to said readout combination.

14. The invention defined in claim 13 and including means responsive to the rolling of a ball after said selected path has been indicated for clearing and resetting said interrogating means and said storage means to condition said ball path indicating means for indicating subsequent ball path selections.

15. A ball path indicating system for a bowling alley comprising, means for sensing the identity of standing pins on a bowling alley pin deck, an indicating device having indicia for indicating to a bowler the positions corresponding to the standing pin positions on a bowling alley, means coacting with said indicia to indicate to the bowler the optimum point of entry a ball should have when entering an array of standing pins to obtain maximum pinfall, and means operative is response to actuation of said sensing means for actuating said point of entry indicating means to establish said optimum point of entry.

16. A ball path indicating system for a bowling alley comprising, means operative after a selected ball is rolled for sensing the identity of standing pins on a bowling alley pin deck, an indicating device having indicia for indicating to a bowler the positions corresponding to the standing pin positions on a bowling alley, means coacting with said indicia to indicate to the bowler the optimum point of entry a ball should have when entering an array of standing pins to obtain maximum pinfall, and means operative in response to actuation of said sensing means for actuating said point of entry indicating means to establish said optimum point of entry.

17. A ball path indicating system for a bowling alley comprising, means for sensing a selected condition of pins after a ball is rolled, an indicating device having indicia for indicating to a bowler the positions corresponding to the standing pin positions on a bowling alley, means coacting with said indicia to indicate to the bowler a selected path along which to roll a ball to knock down the maximum number of pins, and means operative in response to actuation of said sensing means for actuating said ball path indicating means to establish said selected path of travel.

18. A ball path indicating system for a bowling alley comprising, means for sensing a selected condition of pins on a bowling alley pin deck, means for interrogating said sensing means to determine the identity of standing pins after a ball is rolled, an indicating device having indicia for indicating to a bowler the positions corresponding to the standing pin positions on a bowling alley, means coacting with said indicia to indicate to the bowler a selected path along which to roll a ball to knock down a maximum number of pins, and means connected to said interrogating means and operative in response to actuation of said sensing means for actuating said ball path indicating means to establish said selected path of travel.

19. A ball path indicating system for a bowling alley comprising, means for sensing the identity of standing pins on a bowling alley pin deck, means for interrogating said sensing means to determine the number and position of standing pins after a first ball is rolled, an indicating device having indicia for indicating to a bowler the positions corresponding to the standing pin positions on a bowling alley, means coacting with said indicia to indicate to the bowler the optimum point of entry a ball should have when entering an array of standing pins to obtain maximum pinfall, and means connected to said interrogating means and operative in response to actuation of said sensing means for actuating said point of entry indicating means to indicate to a bowler the optimum point of entry his next succeeding ball should have to knock down the maximum number of pins.

20. A ball path indicating system for a bowling alley comprising, means for sensing a selected condition of pins after a first ball of a frame is rolled, an indicating device having indicia for indicating to a bowler the positions corresponding to the standing pin positions on a bowling alley, means coacting with said indicia to indicate to the bowler the optimum point of entry a ball should have when entering an array of standing pins to obtain maximum pinfall, and means operative in response to the rolling of a second ball for clearing and conditioning said ball path indicating means to indicate the optimum point of entry into a standing pin array, after the next successive ball is rolled.

21. A ball path indicating system for a bowling alley comprising, means for sensing the identity of standing pins on a bowling alley pin deck, interrogating means connected to said sensing means and operative to determine the number of standing pins, ball path selecting means connected to said sensing means and operative in response to activation of said interrogating means to select the optimum ball path, according to the number and position of standing pins, for knocking down the maximum number of said pins, and indicating means connected to said ball path selecting means for indicating to a bowler the path selected.

22. Means for indicating the optimum ball path for knocking down the maximum number of pins on a bowling alley comprising, a plurality of discrete means for sensing the position of each standing pin, means for interrogating each of said sensing means to detect the standing pin combination, means for temporarily storing the combination determined by said interrogating means, said storing means comprising a plurality of circuits arranged into groups, each circuit being representative of a selected standing pin combination and having active and passive states, discrete indicia means associated with each group of said storing circuits and adapted to be actuated when a storing circuit in an associated group is activated, and means connected to said interrogating means for selectively activating one of said storing circuits, whereby the indicia means actuated thereby is operative to indicate to a bowler the optimum entry position a ball should have when it enters a desired combination of standing pins.

23. Means for indicating the optimum ball path for knocking down the maximum number of pins on a bowling alley comprising, an indicator having a plurality of indicia means thereon for indicating to a bowler a selected path along which to roll a ball to knock down the maximum number of pins standing on a pin deck, means for totalizing the number of standing pins, a plurality of switching means forming switching groups, each group being associated with a pin and actuated when said standing pins are sensed, said switching means of said groups being interconnected to form circuit paths representative of standing pin combinations, and means connected to said totalizing means and responsive to the number of pins totalized for actuating one of said circuit paths, one of said indicia means of said indicator being associated with at least one of said selected circuit paths and activated thereby to indicate to a bowler a selected path along which to roll a ball to knock down the maximum number of pins.

24. In a bowling ball path indicating system, the combination comprising a facsimile of pin spots arranged in a triangular pattern according to the rules of a bowling game, movable indicia means operative to travel around the outer perimeter of said pin spot pattern facsimile to indicate a selected point of entry of a bowling ball into said triangular pattern, and means responsive to the number and position of standing pins on the pin deck of the bowling alley at a selected period of time during a playing frame for moving said movable indicia means to a selected position on the perimeter of said facsimile corresponding to the optimum entry position a ball should have when it enters a desired combination of standing pins.

25. In a bowling ball path indicating system the combination comprising, a facsimile of pin spots arranged in a field pattern according to the rules of the bowling game, movable indicia means operative to travel around the outer perimeter of said pin spot field pattern facsimile to indicate a selected point of entry of a bowling ball in said field pattern, means for moving said indicia means, means responsive to the number and position of standing pins on the pin deck of a bowling alley at a selected period of time during a playing frame for actuating said indicia moving means to move said indicia means to a selected position on the perimeter of said facsimile corresponding to the optimum point of entry of a ball in said field pattern to knock down the maximum number of pins, a plurality of means disposed in selected positions about said outer perimeter of said facsimile and operable, when activated, to incapacitate said indicia moving means, said incapacitating means being selectively activated by said means for actuating said indicia moving means, and means associated with said indicia means for successively actuating each of said incapacitating means along its path of travel, each of said incapacitating means, when activated and when actuated by said moving indicia means being effective to incapacitate said moving means and cause said moving indicia means to halt at said position of said incapacitating means, and indicate the ball path for knocking down the maximum number of pins standing on said pin deck.

26. Means for indicating the optimum ball path for knocking down the maximum number of pins on a bowling alley comprising, a plurality of discrete means for sensing the position of each standing pin, means for interrogating each of said sensing means to detect a standing pin combination, means for temporarily storing the combinations determined by said interrogating means, said storing means comprising a plurality of circuits each representative of a selected standing pin combination, means connected to said interrogating means for selectively activating one of said storing circuits, a facsimile of pin spots arranged in a field pattern according to the rules of a bowling game, movable indicia means operative to travel around the outer perimeter of said pin spot pattern facsimile to indicate a discrete point of entry of a bowling ball into said field pattern, actuating means for moving said indicia means, a plurality of switches disposed about the outer perimeter of said facsimile and positioned at locations representative of said discrete points of entry, means responsive to a detected standing pin combination for serially connecting at least one of said switches to an activated storing circuit combination and to said actuating means for moving said indicia means, means associated with said indicia means for successively actuating said switches during the course of travel of said movable indicia means about said pattern perimeter, said actuated switches being adapted, when connected to an activated storing circuit combination, to incapacitate said moving means and cause said moving indicia means to halt at said switch position to thereby indicate the optimum point of entry of a bowling ball into said field pattern in order to known down the maximum number of standing pins.

27. In a bowling ball path indicating system, the combination comprising a facsimile of pin spots arranged in a field pattern according to the rules of the bowling game, a plurality of revealable indicia associated with said pin spot facsimile, each indicia, when revealed to a bowling player, being adapted to indicate a selected point of entry of a bowling ball into said field pattern, means for selectively revealing each of said indicia, in accordance with a predetermined arrangement of standing pins, and means responsive to the number and position of standing pins on the pin deck of a bowling alley at a selected period of time during a playing frame for actuating said revealing means to selectively reveal the indicia corresponding to the optimum point of entry for a ball in order to knock down the maximum number of said pins standing at said selected period of time.

28. In a bowling ball path indicating system, the combination comprising a facsimile of pin spots arranged in a triangular pattern according to the rules of the bowling game, a plurality of illuminable indicia associated with said pin spot facsimile, each indicia, when illuminated, being adapted to indicate a selected point of entry of a bowling ball into said triangular pattern, means for selectively illuminating each of said indicia in accordance with a predetermined arrangement of standing pins, and means responsive to the number and position of standing pins on the pin deck of a bowling alley at a selected period of time during a playing frame for actuating said illuminating means to selectively illuminate the indicia corresponding to the optimum point of entry for a ball in order to knock down the maximum number of said pins standing at said selected period of time.

29. The invention defined in claim 28 wherein said illuminable indicia includes a plurality of symbols arranged adjacent said pin spots and adapted, when illuminated, to indicate the point, with respect to pin spots adjacently associated therewith, where a bowling ball should enter said triangular pattern to knock down the maximum number of standing pins.

30. In combination with a bowling pin spotting machine, a ball path indicating system comprising, means for sensing the identity of standing pins on a bowling alley pin deck, means actuated during a predetermined portion of the operating cycle of the machine for interrogating said sensing means to determine the number of standing pins, ball path selecting means connected to said sensing means and operative in response to actuation of said interrogating means to select the optimum ball path, according to the number and position of standing pins, for knocking down the maximum number of said pins, and indicating means connected to said ball path selecting means for indicating to a bowler the path selected.

31. A ball path indicating system for a bowling alley comprising, means for sensing the identity of standing pins on bowling alley pin deck, means connected to said sensing means for storing sensed information representative of the position of said standing pins, means connected to said sensing means for totalizing and storing sensed information representative of the numerical totals of standing pins, ball path selecting means connected to said position information storing means and said numerical totals information storage means and operative in response to said stored information to select an optimum ball path along which to roll a ball to knock down the maximum number of pins, and indicating means connected to said ball path selecting means for indicating to the bowler the path selected.

32. A ball path indicating system for a bowling alley comprising, means for sensing the identity of standing pins on a bowling alley pin deck, means connected to said sensing means for storing sensed information representative of the position of said standing pins, means connected to said sensing means for totalizing and storing sensed information representative of the numerical totals of standing pins, ball path selecting means connected to said position information storing means and said numerical totals information storage means and operative in response to said stored information to select an optimum ball path along which to roll a ball to knock down the maximum number of pins, said ball path selecting means including a plurality of pin combination circuits each representative of a selected standing pin combination and having active and passive states, one of said circuits being selectively activated by said information storing means and said numerical totals storing means after said standing pins are sensed, and selected indicia connected to selected groups of said storing circuits and adapted to be actuated when a corresponding pin combination circuit is activated to indicate to the bowler the path selected.

33. A ball path indicating system for a bowling alley of type having a plurality of bowling pins arranged on a pin deck comprising, a plurality of pin sensing means, one associated with each pin for sensing the presence of standing pins, each sensing means being activated by an associated standing pin, a first stepping relay having a plurality of contacts and an associated wiper finger, each of said contacts being connected to one of said sensing means, said first stepping relay being adapted to scan said contacts and search for activated sensing means, a second stepping relay having a plurality of contacts, a wiping finger therefore and a driving circuit connected to the wiping finger of said first stepping relay, said second stepping relay being operative to advance its wiping finger one contact position each time an activated sensing means is scanned by said first stepping relay, a plurality of multiple contact relays, each multiple contact relay being associated with one of said sensing means and operative to be energized when said associated sensing means is activated, said contacts of said multiple contact relays being selectively interconnected to form circuit paths representative of selected standing pin combinations, each of said circuit paths having a pair of terminals and being arranged into groups with each group having a common output terminal connected to one terminal of each circuit path associated therewith, the other terminal of each circuit path being connected to a selected contact of said second stepping relay, indicating means associated with each of said output terminals and adapted to indicate to a bowler a selected ball path for knocking down the maximum number of pins of a standing pin combination when a selected circuit path is activated by actuation of the contacts associated therewith and engagement of said wiping finger of said second stepping relay with one of said contacts associated therewith, said last named wiping finger being connected to a source for energizing said indicating means, and means for actuating said sensing means and said first stepping relay at a predetermined time to cause said indicating means to indicate the optimum ball path for a selected standing pin combination.

34. The invention defined in claim 33 and including means actuated at a second predetermined period of time for deactivating said sensing means, whereby said multiple contact relays are de-energized, and for resetting said second stepping relay to zero to condition said ball path indicating system for indicating a new standing pin combination.

References Cited by the Examiner

UNITED STATES PATENTS

| | | | |
|---|---|---|---|
| 2,336,997 | 12/43 | Mobley | 35—29 |
| 2,974,955 | 3/61 | Walsh | 273—43 |
| 2,983,510 | 5/61 | Blewitt | 273—43 |
| 2,990,177 | 6/61 | Hutchison | 273—54 X |
| 3,011,785 | 12/61 | Torresen | 273—52 X |
| 3,051,485 | 8/62 | Heilbrun | 273—54 |
| 3,058,746 | 10/62 | Oder | 273—54 |
| 3,076,652 | 2/63 | Wolff | 273—54 |
| 3,082,000 | 3/63 | Holcombe | 273—54 X |
| 3,094,330 | 6/63 | Smith | 273—54 |

DELBERT B. LOWE, *Primary Examiner.*